(12) United States Patent
Pitt et al.

(10) Patent No.: US 8,263,158 B2
(45) Date of Patent: Sep. 11, 2012

(54) MEAT STRETCHING DEVICE AND METHOD

(75) Inventors: Arthur Pitt, Hamilton (NZ); Clyde Charles Daly, Cambridge (NZ)

(73) Assignees: Meat & Wool New Zealand Limited (NZ); Meat & Livestock Australia Limited (AU)

( * ) Notice: Subject to any disclaimer, the term of this patent is extended or adjusted under 35 U.S.C. 154(b) by 118 days.

(21) Appl. No.: 12/594,336

(22) PCT Filed: Apr. 4, 2008

(86) PCT No.: PCT/NZ2008/000072
§ 371 (c)(1),
(2), (4) Date: Mar. 11, 2010

(87) PCT Pub. No.: WO2008/123782
PCT Pub. Date: Oct. 16, 2008

(65) Prior Publication Data
US 2010/0166931 A1    Jul. 1, 2010

Related U.S. Application Data

(60) Provisional application No. 60/910,018, filed on Apr. 4, 2007.

(51) Int. Cl.
*A23P 1/10*    (2006.01)
(52) U.S. Cl. ............... 426/513; 99/472; 99/454; 99/349
(58) Field of Classification Search .................. 426/448, 426/514, 517, 138, 140, 512, 513; 452/30–51; 100/910; 425/405.1; 99/349, 472, 454, 353, 99/356, 426, 439, 428, 440; 53/523, 111 R, 53/113, 122, 526–527, 530
See application file for complete search history.

(56) References Cited

U.S. PATENT DOCUMENTS
2,999,270 A * 9/1961 Knapp ............................ 452/31
3,611,657 A * 10/1971 Inoue et al. ...................... 53/64
(Continued)

FOREIGN PATENT DOCUMENTS
GB    1 206 023    9/1970
(Continued)

*Primary Examiner* — Steven Leff
(74) *Attorney, Agent, or Firm* — Lewis, Rice & Fingersh, L.C.

(57) ABSTRACT

The invention provides a meat stretching device. The device includes a receptacle and a flexible sleeve. The flexible sleeve is mounted within the receptacle, the flexible sleeve having a cross-section that defines an aperture to receive one or more cuts of meat. The receptacle is connectable to an air pressure device that is capable of generating a positive pressure in the receptacle to cause the flexible sleeve to constrict around and stretch the one or more cuts of meat that are received in the aperture. In one form the flexible sleeve has a first end and a second end, and a cross-section that defines an aperture, the first end being adapted to receive one or more cuts of meat and the second end being adapted to allow the one or more cuts of meat to be removed from the flexible sleeve. In this form the flexible sleeve is mounted within the receptacle such that an airtight volume is formed between the flexible sleeve and the receptacle. The flexible sleeve constricts around and stretches the one or more cuts of meat when the airtight volume is subjected to positive pressure. The invention further provides a related method of stretching meat.

18 Claims, 3 Drawing Sheets

U.S. PATENT DOCUMENTS

| | | | | |
|---|---|---|---|---|
| 4,457,122 A * | 7/1984 | Atkins et al. | | 53/434 |
| 5,279,608 A * | 1/1994 | Cherif Cheikh | | 604/892.1 |
| 6,506,432 B1 | 1/2003 | Kortschack | | |
| 6,637,177 B1 * | 10/2003 | Trillich et al. | | 53/434 |
| 2004/0144063 A1 * | 7/2004 | Countz | | 53/434 |

FOREIGN PATENT DOCUMENTS

| | | |
|---|---|---|
| WO | 95/19709 A | 7/1995 |
| WO | 2006/079022 A2 | 7/2006 |

\* cited by examiner

MEAT STRETCHING DEVICE AND METHOD

CROSS REFERENCE TO RELATED APPLICATION(S)

This application is a §371 National Stage PCT Application PCT/NZ2008/000072 filed Apr. 4, 2008, which in turn claims benefit of U.S. Provisional Patent Application Ser. No. 60/910,018, filed Apr. 4, 2007. The entire disclosure of both documents is herein incorporated by reference.

BACKGROUND

1. Field of the Invention

The present invention relates to a meat stretching device and method. In particular, but not exclusively, the present invention relates to a meat stretching device and method using a flexible sleeve.

2. Description of the Related Art

The processing of a carcass and the meat extracted from the carcass has a significant influence on the quality attributes of the meat. This is because various changes take place in the biochemical and structural attributes of muscle tissue in the meat during processing. This is especially so when the meat transforms from a pre-rigor-mortis state to a post-rigor-mortis state.

There are two main factors that determine the pre-rigor state of the meat—the rate of pH fall and the rate of cooling of the meat. The rate of pH fall can be improved by subjecting the meat to electrical stimulation, while the rate of cooling of the meat can be improved by reducing the size of the cut of meat. Any reduction in cut size is preferably done before the carcass is chilled and while the muscles are still in a pre-rigor state. This process is generally referred to as hot boning.

Once meat is cut to size, its shape may be manipulated. Manipulation by stretching of meat shape has been shown to improve the meat's tenderness and colour stability, and reduce its drip loss. Also, the manipulation of the shape of the meat allows the portion size of the meat to be controlled.

An example way in which the shape of a meat cut can be manipulated is disclosed in U.S. Pat. No. 6,824,846. In particular, the patent discloses a method of packaging objects, such as meat, where the object to be packaged is pushed through a funnel and into an elastic packaging sleeve. Given its elastic nature, the packaging sleeve wraps closely around the object. Where meat is packaged, the process of pushing the meat through the funnel manipulates its shape, which is then maintained by the elastic packaging sleeve.

In this specification, where reference has been made to patent specifications, other external documents, or other sources of information, it is generally for the purpose of providing a context for discussing the features of the present invention. Unless specifically stated otherwise, reference to such external documents or sources of information is not to be construed as an admission that such documents or sources of information in any jurisdiction are prior art, or form part of the common general knowledge in the art.

It is an object of the present invention to either provide an improved device and method to stretch meat or at least provide the public with a useful choice.

SUMMARY OF THE INVENTION

In one form, the present invention relates to a meat stretching device comprising: a receptacle; and a flexible sleeve mounted within the receptacle, the flexible sleeve having a cross-section that defines an aperture to receive one or more cuts of meat; wherein the receptacle is connectable to an air pressure device that is capable of generating a positive pressure in the receptacle to cause the flexible sleeve to constrict around and stretch the one or more cuts of meat that are received in the aperture.

Preferably, the air pressure device is further capable of generating at least a partial vacuum in the receptacle to cause the aperture of the flexible sleeve to widen to receive one or more cuts of meat.

Preferably, the device further comprises a pushing rod to push the one or more cuts of meat out of the constricted flexible sleeve.

Preferably, the device further comprises one or more cylinders connected at one end to the receptacle, and connected at another end to a plate that is attached to the flexible sleeve.

Preferably, the flexible sleeve is a nitrate rubber compound sleeve.

In another form, the present invention relates to a meat stretching device comprising: a receptacle; and a flexible sleeve having a first end and a second end, and a cross-section that defines an aperture, the first end being adapted to receive one or more cuts of meat and the second end being adapted to allow the one or more cuts of meat to be removed from the flexible sleeve; wherein the flexible sleeve is mounted within the receptacle such that an airtight volume is formed between the flexible sleeve and the receptacle, and wherein the flexible sleeve constricts around and stretches the one or more cuts of meat when the airtight volume is subjected to positive pressure.

Preferably, the device further comprises a packaging arrangement arranged adjacent to the second end of the flexible sleeve.

Preferably the receptacle includes a pair of annular flanges at one or both ends of the receptacle, the pair(s) of annular flanges arranged to hold one or respective ends of the flexible sleeve.

Preferably the device further comprises at least one extending cylinder for varying the length of the sleeve.

Preferably the device includes at least one inflatable bladder disposed within the receptacle, the bladder(s) configured to reduce the circumference of the flexible sleeve on inflation of the bladder(s).

In another form, the present invention comprises a method of stretching meat using a flexible sleeve, the method comprising the steps of: inserting one or more cuts of meat into an aperture defined by a cross-section of the flexible sleeve; generating a positive pressure in an airtight volume between the flexible sleeve and a receptacle containing the flexible sleeve to cause the flexible sleeve to constrict around and stretch the one or more cuts of meat.

Preferably, the method further comprises the step of generating at least a partial vacuum in the airtight volume to widen the aperture before inserting the one or more cuts of meat into the aperture.

Preferably, the method further comprises the step of pushing the one or more cuts of meat out of the constricted flexible sleeve.

Preferably the method further comprises removing the one or more cuts of meat using peristaltic action.

Preferably, the method further comprises the step of stretching the sleeve lengthwise to assist the flexible sleeve constrict around the one or more cuts of meat.

Preferably the device further comprising one or more pairs of ribs disposed within the housing, the inflatable bladder(s) located between respective pairs of ribs.

Preferably the pair(s) of ribs are adapted to constrain undue lateral movement of the bladder(s).

The term 'comprising' as used in this specification means 'consisting at least in part of', that is to say when interpreting statements in this specification which include that term, the features, prefaced by that term in each statement, all need to be present but other features can also be present. Related terms such as 'comprise' and 'comprised' are to be interpreted in similar manner.

The present invention may also be said broadly to consist in the parts, elements and features referred to or indicated in the specification of the application, individually or collectively, and any or all combinations of any two or more said parts, elements or features. Where specific integers are mentioned herein which have known equivalents in the art to which this invention relates, such known equivalents are deemed to be incorporated herein as if individually set forth.

BRIEF DESCRIPTION OF THE FIGURES

Preferred forms of the device and method of the present invention will now be described with reference to the accompanying figures in which:

FIG. 2b shows a plan view of the device of FIG. 2a, FIG. 2c shows a side view of the device of FIG. 2a, and FIG. 2d shows a front view of the device of FIG. 2a.

DETAILED DESCRIPTION OF THE PREFERRED FORMS

Figure 1A:
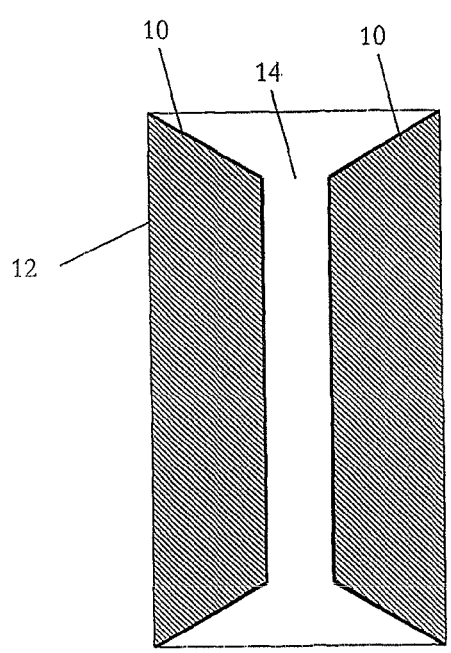
FIGS. 1a-1d show a side view cross-sectional schematic of the device of the present invention.

A cross-sectional schematic of one form of the device of the present invention is shown in FIGS. 1a-d. In FIG. 1a, a flexible sleeve 10 is shown attached to a receptacle 12. In one preferred form, the sleeve 10 is a nitrate rubber compound sleeve. Of course, other materials may be used instead such as silicon and plastics such as polyethylene terephthalate, polyvinyl chloride and polypropylene.

In the figures, the flexible sleeve 10 is illustrated as having a tapering shape near the ends of the sleeve. This tapering shape is the result of stretching the edges of the preferred form sleeve, which has a diameter smaller than that of the receptacle, to attach to the edges of the receptacle 12. Persons skilled in the art will appreciate that various forms of sleeve can be used, which may or may not result in a similar tapering shape when stretched. All that is required is for the sleeve to be able to constrict around cuts of meat, as will be described in detail below.

Cuts of meat suited for use in this invention include beef, chicken, lamb or goat portions. Meat cuts also include whole gutted fish such as salmon or trout. Meat cuts further include mechanically recovered or reconstituted meat as well as cut portions.

When not in use, the area between the sleeve 10 and the receptacle 12 (herein referred to as the interior of the receptacle), which is shown in shade, is under ambient pressure. Also, when not in use, an aperture 14, which is defined by the cross-section of the sleeve 10, preferably has a width smaller than the cuts of meat to be stretched.

Figure 1B:
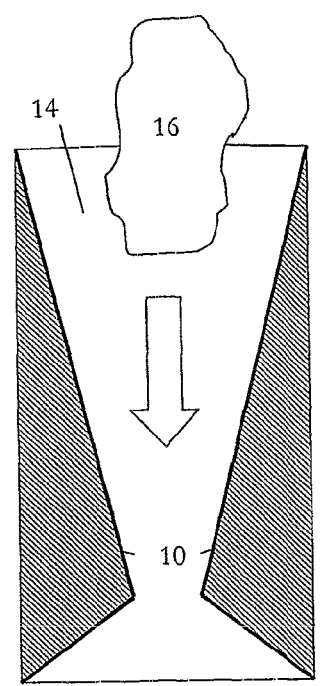

The preferred form method will now be described with reference to FIGS. 1b-d. As illustrated, the interior of the receptacle (shown in shade) is subjected to at least a partial vacuum generated by an air pressure device. This causes the wall of the sleeve 10 to be drawn closer to the wall of the receptacle. This, in turn, causes the aperture 14 defined by the sleeve 10 to widen. In the form shown, only the top portion (called the 'working area') of the sleeve 10 is caused to widen, leaving at least part of the bottom of the sleeve 10 to remain small enough to stop the meat cut from falling right through the sleeve.

Skilled persons will appreciate that the step of widening the sleeve is not essential as the initial size of the aperture may be wide enough to receive cuts of meat. In the figure, the cut of meat 16 is shown to be a large cut, which requires the aperture 14 to be widened. Preferably, the initial size of the aperture 14 is small, which would necessitate the widening of the aperture before cuts of meat can be inserted into the aperture. The benefit of a small initial size of the aperture 14 is that the initial expansion of the sleeve under partial vacuum to receive the meat cut will assist with further stretching of the meat cut as the sleeve returns to its natural, smaller size when the partial vacuum is removed.

Figure 1C:
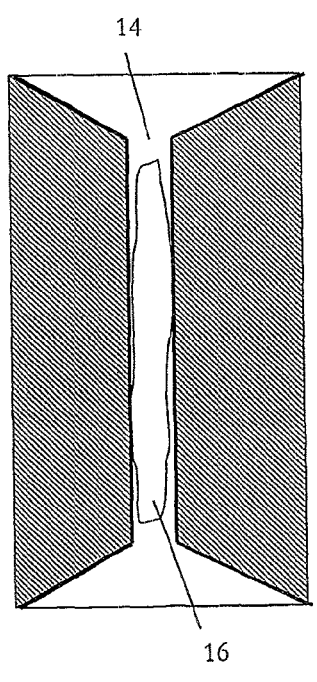

In FIG. 1c, the interior of the receptacle 12 (shown in shade) is subjected to positive pressure generated by the air pressure device. Positive pressure is essentially pressure that is greater than the ambient pressure surrounding the receptacle. In most applications of the present invention, positive pressure will be pressure greater than atmospheric pressure. The positive pressure forces the sleeve 10 to constrict around the meat cut 16. As pressure is applied, the meat cut 16 is squeezed and stretched along the axis of the sleeve 10. This reduces the diameter of the meat cut 16, and increases the length of the meat cut 16 as illustrated. Where a nitrate rubber compound sleeve or similar low-friction sleeve is used, the stretching of the meat cut 16 can be made easier and less damaging to the meat cut 16.

Figure 1D:
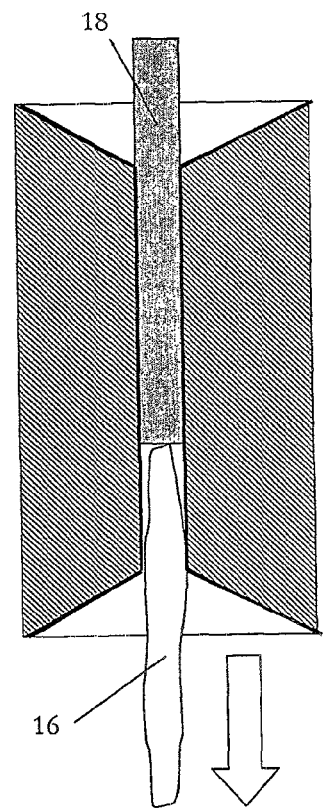
Figure 2A:
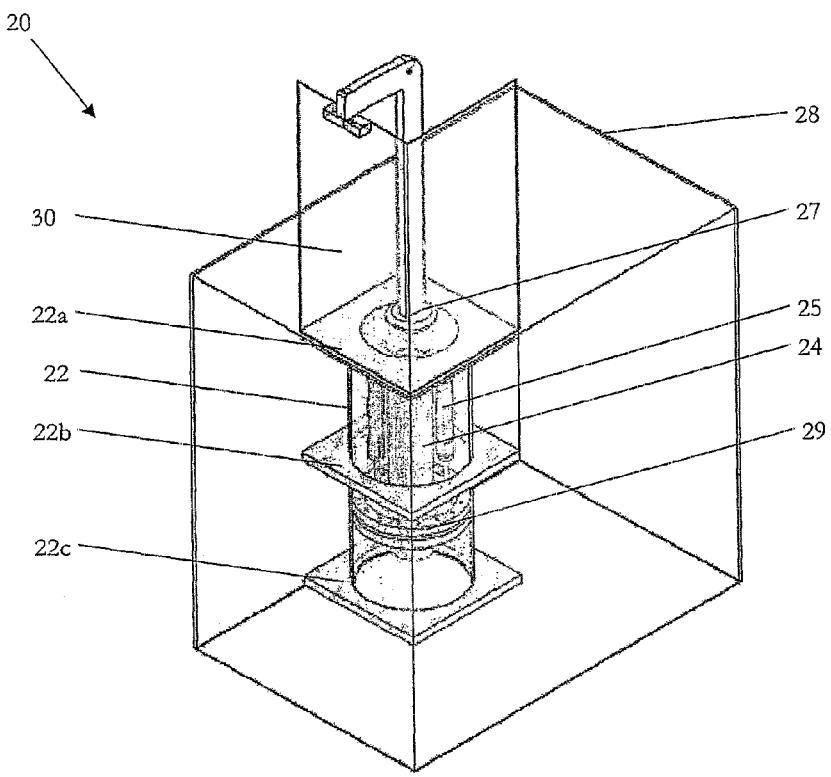
FIG. 2a shows a perspective view of the preferred form device of the present invention.
Figure 2B:
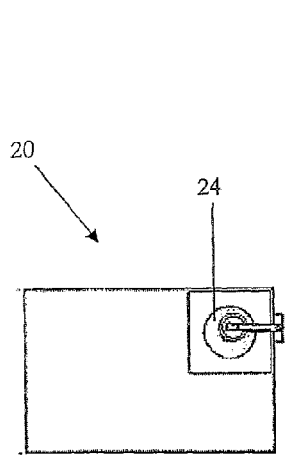
Figure 2C:
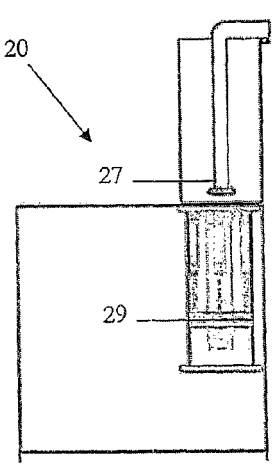
Figure 2D:
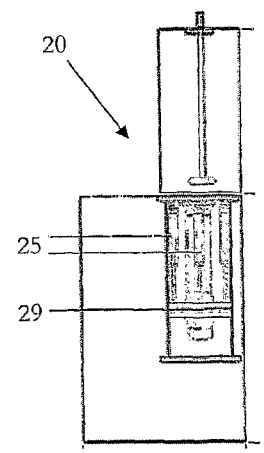

Referring now to FIG. 1d, a piston-like pushing rod 18 is optionally used to push the stretched meat cut 16 out of the constricted sleeve 10. Although the figure shows the meat cut 16 being extracted from the bottom of the flexible sleeve, the present invention can be worked such that the meat cut 16 is extracted from the top part of the flexible sleeve. One way to do this will be described later in this specification.

Regardless of whether the stretched meat cut 16 is extracted from the top or bottom of the sleeve, in the preferred embodiment, the device includes a packaging arrangement to receive the stretched meat cut 16. The packaging arrangement may use an inflexible packaging to ensure the meat cut 16 retains its stretched form until rigor mortis sets in.

A preferred form of the meat stretching device of the present invention is shown generally with arrow 20 in FIGS. 2a-d. The device 20 includes a receptacle 22, which is preferably a cylindrical receptacle having supporting plates 22a, 22b and 22c. The form of the receptacle shown in the figure is merely illustrative; where necessary or desired, the receptacle 22 can be made to be in another shape, size or configuration.

The device 20 also includes a flexible sleeve 24 that is mounted within the receptacle 22. In the form shown, the flexible sleeve 24 is attached to the supporting plate 22a on one end using, for example, bolts, clamps or the like. On the other end, the flexible sleeve 24 is attached to a plate 29. In the preferred form, the plate 29 comprises two or more plates that are attached together and that is movable or slidable along the receptacle 22 using one or more cylinders 25. The plate preferably comprises two or more individual plates that clamp at least part of the flexible sleeve to achieve an acceptable seal in the interior of the receptacle (i.e. between the sleeve and the receptacle walls). The above forms of attaching the sleeve to the receptacle are, of course, not the only forms of attachments that can be used. Skilled people will recognise that the purpose of the attachment is to achieve a substantially airtight seal for the interior of the receptacle 22. Any attachment that can achieve this can be used in the present invention.

Although not shown in the figure, the receptacle 22 is connectable to an air pressure device. In the preferred form, the air pressure device is arranged to selectively generate at least a partial vacuum or positive pressure within the interior of the receptacle.

As mentioned earlier, one or more cylinders 25 are provided in the preferred form device to controllably move or slide the plate 29 along the receptacle. This is required in the preferred form to control the extent to which the flexible sleeve 24 is able to open and close to stretch cuts of meat. For instance, when vacuum or at least partial vacuum is generated in the interior of the receptacle, atmospheric pressure on the outside of the flexible sleeve 24 has a greater tendency to contract and shorten the sleeve than to expand the aperture defined by the flexible sleeve 24. To stop the sleeve from contracting and shortening, the one or more cylinders 25 are provided to force the sleeve length to remain the same as (or to be greater than) the length prior to the vacuum or partial vacuum being generated. The one or more cylinders also control the sleeve length after the vacuum or partial vacuum is removed to control the extent to which the aperture defined by the sleeve closes.

The device optionally includes a pushing rod, such as piston 27, to extract meat that has been stretched by the device. The extracted meat is preferably received in an inflexible packaging sleeve that maintains the shape of the meat until rigor mortis sets in. For this, a packaging arrangement may be provided adjacent the end of the flexible sleeve from which the stretched meat is extracted.

Alternatively or additionally, the piston 27 itself is arranged to receive an inflexible packaging sleeve. For instance, the packaging sleeve could be a stainless steel sleeve that is coated with a low-friction coating, such as Teflon. The stainless steel sleeve could be used to temporarily hold the meat in its stretched form before it is packaged in a final packaging sleeve. Where such a packaging sleeve is used, the bottom end of the flexible sleeve is sealed or otherwise closed before the piston 27 is pushed into the flexible sleeve 24. The movement of the piston 27 into the sealed flexible sleeve 24 then causes a pressure build-up in the flexible sleeve, which results in the stretched meat being pushed upwardly toward the piston 27.

By arranging a packaging sleeve about the piston 27, the stretched meat is forced to enter the packaging sleeve. Once in the packaging sleeve, the piston 27 can be pulled out of the flexible sleeve while retaining the meat within the packaging sleeve. In this form, the stretched meat is forced to remain in its stretched form even after extraction from the flexible sleeve.

It is also preferable for the device 20 to be provided in an enclosure 28, which may house the control system of the device 20 and the air pressure device (not shown).

In some embodiments, the device also preferably includes a guard 30. The guard 30 covers a pinch area that forms when the sleeve returns to its original shape after the positive pressure is removed. Also, in some embodiments, the device may extract stretched meat from the flexible sleeve 24 by pulling the plate 29 upwardly using the cylinders 25. This results in the flexible sleeve 24 being at least partially pushed out of the receptacle before it is pulled back into the receptacle for further stretching processes. The guard 30, in these embodiments, can help reduce the risk of a user accidentally coming into contact with the flexible sleeve 24 and being injured as the flexible sleeve 24 is pulled back into the receptacle.

Figure 3:
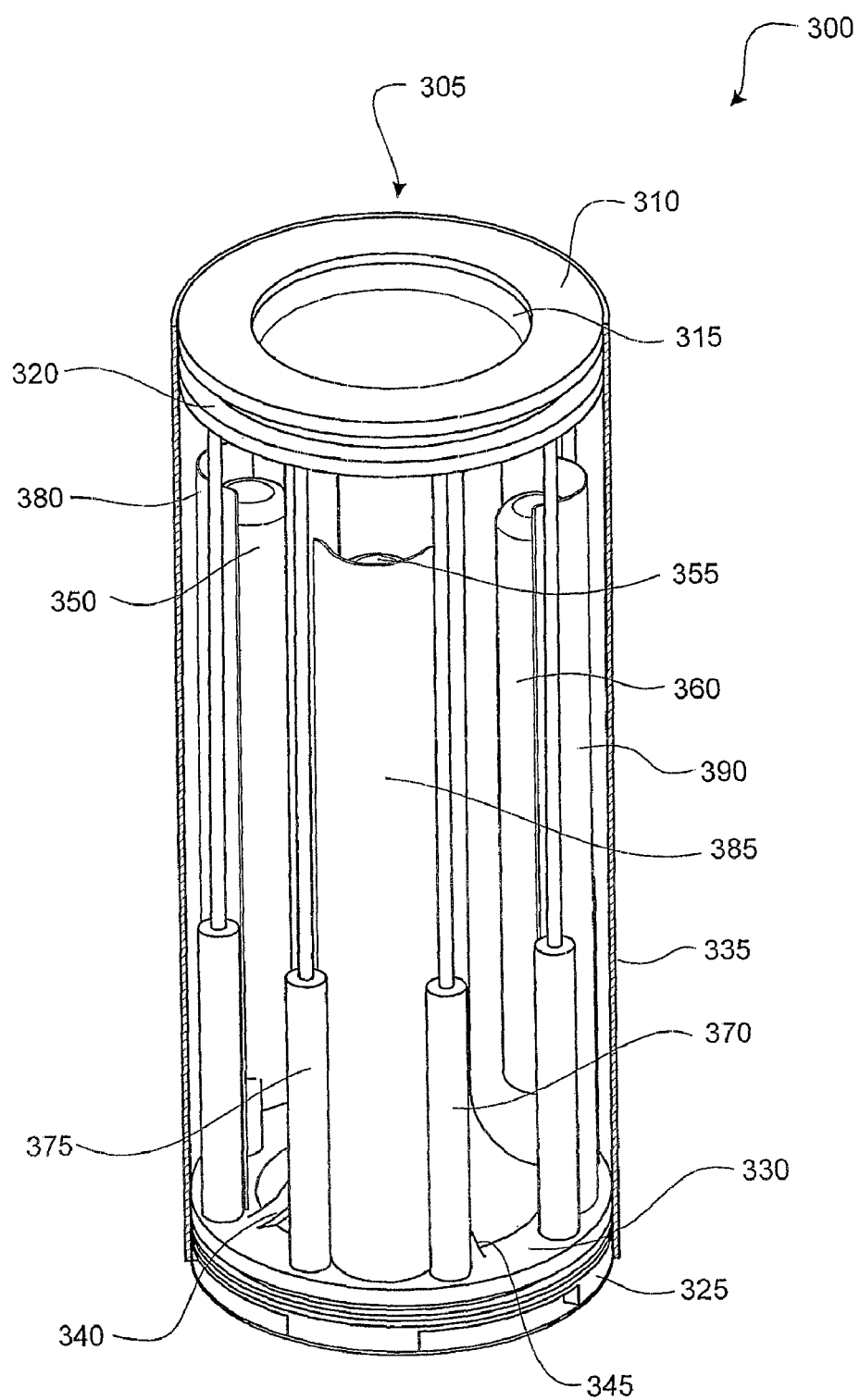
FIG. 3 shows a further preferred form meat stretching device.

FIG. 3 shows a further preferred form meat stretching device 300. The device includes an aperture 305 at one end of the device. The device shown in FIG. 3 includes a further aperture at the opposite end of the device. The aperture 305 is formed and maintained by a rigid annular flange or ring 310. Ring or flange 310 is formed from a suitable rigid material such as sheet metal.

Disposed against flange 310 is one end of a flexible medium or sleeve 315. The sleeve is held open to form an aperture at one end by ring 310. A further rigid annular flange 320 ensures that the end of the sleeve 315 is held between flanges 310 and 320.

The other end of sleeve 315 is located between similar annular flanges 325 and 330.

The flexible sleeve 310 is disposed within a rigid receptacle or housing 335. Also disposed within housing 335 are a plurality of flexible ribs. FIG. 3 shows ribs 340 and 345. As shown in FIG. 3 ribs 340 and 345 are positioned within housing 335. Each end of each rib is attached to respective ends of the exterior of the sleeve 315

The ribs in one embodiment are formed from the same material as the sleeve 315. In another embodiment the ribs are formed from a different material. The ribs could be either more rigid or less rigid than the sleeve 315.

As shown in FIG. 3 the ribs tend to flare out at each end of housing 335 to match the increased diameter of the sleeve 315 at each end. The ribs are positioned at uniform intervals around the interior of the housing in a circular configuration. The circumference of the circle defined by the ribs is greater at each end of the sleeve 315. As shown in FIG. 3 in one preferred form the circumference reduces to a constant point and then does not vary further along the interior of the housing 335.

Disposed between adjacent pairs of ribs is at least one and preferably a plurality of inflatable cylinders or bladders. One such bladder is indicated at 350. Other bladders are shown at 355 and 360. Bladder 355 is shown disposed between rib 340 and rib 345.

The ribs have the effect of locating the bladders between adjacent pairs of ribs so that the bladders do not undergo undue lateral movement during inflation. The ribs constrain undue lateral movement of the bladders.

Also shown in FIG. 3 is at least one and preferably a plurality of extending cylinders. One such cylinder is shown at 370 and another at 375. It is anticipated that the cylinders 370 and 375 are arranged to be shortened or lengthened to vary the distance between the end of the sleeve adjacent to flange 330 and the aperture 305. These cylinders can be shortened to vary the length of the sleeve. This shortening removes tension on the sleeve thereby allowing flexible sleeve 315 to be replaced with a fresh replacement sleeve.

In use a meat cut is placed within flexible sleeve 315 through aperture 305. Bladders 350, 355 and 360 are inflated with air or other gas or liquid. The bladders are constrained from expanding outward by housing 335. The bladders are optionally further constrained by panels 380, 385 and 390. The bladders are constrained from extending laterally by ribs 340 and 345.

As the bladders continue to be inflated, the circumference of the sleeve 315 reduces causing the meat to lengthen within sleeve 315. As air continues to be introduced into the bladders 350, 355 and 360, the ends of the bladders closest to the ends of the sleeve 315 expand to fill the wider circumference around each end of the meat cut. Each end of the sleeve is held between the respective pairs of annular flanges described above. Where there is a gap between the end of the meat cut(s) and an end of the sleeve, the sections of the bladders at that end of the sleeve expand to a greater degree than those portions of the bladders that are constrained by the meat cut within the sleeve.

The circumference of the sleeve 315 at the other end from the clamp reduces so that it is less than the circumference of the sleeve closest to the clamp. As the sleeve constricts around the meat cut this causes a peristaltic force that urges the meat cut toward the aperture 305. As the meat cut travels along the flexible medium toward aperture 305, the flexible sleeve further constricts around the end of the meat cut closest to the flange 330 causing further peristaltic force to be placed on the meat cut.

In this way the use of a piston as described above can be avoided. In the embodiment shown in FIG. 3 the meat cut is able to travel along the flexible sleeve with a peristaltic action. It is envisaged that a piston could be introduced as well as the peristaltic action to further urge the meat cut along the flexible sleeve.

It is also envisaged that the bladders could expand to a greater degree at one of the ends of the flexible sleeve. This would then have the effect of urging the meat toward the other end of the sleeve. This means that the meat cut could be introduced into one end of the housing and could be removed at either end of the housing.

In a further embodiment positive pressure is introduced into one end of the housing. This positive pressure further urges the meat cut along the flexible sleeve. This positive pressure can be introduced in addition to or as an alternative to the piston described above.

The rigidity of the sleeve can be varied according to the type of meat cut selected.

It is envisaged that a packaging medium could be inserted within the sleeve after stretching. The meat cut is then inserted within the packaging medium within the sleeve. This arrangement has the advantage that an additional packaging step is not required.

The foregoing describes the present invention and its preferred forms. Alterations and modifications that are obvious to those skilled in the art are intended to be incorporated within the scope of the present invention.

The invention claimed is:

1. A meat stretching device comprising:
   a receptacle; and
   a flexible sleeve mounted within the receptacle, the flexible sleeve having a cross-section that defines an aperture to receive one or more cuts of meat;
   wherein the receptacle is connectable to an air pressure device that is arranged to selectively generate an at least partial vacuum in the receptacle to receive the one or more cuts of meat in the aperture and selectively generate a positive pressure in the receptacle to cause the flexible sleeve to place a peristaltic force on the one or more cuts of meat that are received in the aperture and constrict and stretch the one or more cuts of meat that are received in the aperture.

2. The meat stretching device as claimed in claim 1 wherein generating the at least partial vacuum in the receptacle causes the aperture of the flexible sleeve to widen to receive the one or more cuts of meat.

3. The meat stretching device as claimed in claim 1 further comprising a pushing rod to push the one or more cuts of meat out of the constricted flexible sleeve.

4. The meat stretching device as claimed in claim 1 further comprising one or more cylinders connected at one end to the receptacle, and connected at another end to a plate that is attached to the flexible sleeve.

5. The meat stretching device as claimed in claim 1 wherein the flexible sleeve is a nitrate rubber compound sleeve.

6. The meat stretching device as claimed in claim 1 configured to apply a peristaltic action to the one or more cuts of meat to remove the one or more cuts of meat from the flexible sleeve.

7. A meat stretching device comprising:
   a receptacle connected to an air pressure device that is arranged to selectively generate an at least partial vacuum and selectively generate a positive pressure within the receptacle; and
   a flexible sleeve having a first end and a second end, and a cross-section that defines an aperture, the first end being adapted to receive one or more cuts of meat while the receptacle is subjected to the at least partial vacuum and the second end being adapted to allow the one or more cuts of meat to be removed from the flexible sleeve;
   wherein the flexible sleeve is mounted within the receptacle such that an airtight volume is formed between the flexible sleeve and the receptacle, and wherein the flexible sleeve places a peristaltic force on the one or more cuts of meat which constricts and stretches the one or more cuts of meat when the airtight volume is subjected to positive pressure.

8. The meat stretching device as claimed in claim 7 further comprising a packaging arrangement arranged adjacent to the second end of the flexible sleeve.

9. The meat stretching device as claimed in claim 7 wherein the receptacle includes a pair of annular flanges at one or both ends of the receptacle, the pair(s) of annular flanges arranged to hold one or respective ends of the flexible sleeve.

10. The meat stretching device as claimed in claim 9 further comprising at least one extending cylinder for varying the length of the sleeve.

11. The meat stretching device as claimed in claim 7 further comprising at least one inflatable bladder disposed within the receptacle, the bladder(s) configured to reduce the circumference of the flexible sleeve on inflation of the bladder(s).

12. The meat stretching device as claimed in claim 11 further comprising one or more pairs of ribs disposed within the receptacle, the inflatable bladder(s) located between respective pairs of ribs.

13. The meat stretching device as claimed in claim 12 wherein the pair(s) of ribs are adapted to constrain undue lateral movement of the bladder(s).

14. A method of stretching meat using a flexible sleeve, the method comprising the steps of:
   generating an at least partial vacuum in an airtight volume between the flexible sleeve and a receptacle containing the flexible sleeve;
   inserting one or more cuts of meat into an'aperture defined by a cross-section of the flexible sleeve while the receptacle is subjected to the at least partial vacuum; and
   generating a positive pressure in the airtight volume between the flexible sleeve and a receptacle containing the flexible sleeve to cause the flexible sleeve to place a peristaltic force on the one or more cuts of meat to constrict and stretch the one or more cuts of meat.

15. The method as claimed in claim 14 wherein generating the at least a partial vacuum in the airtight volume widens the aperture before inserting the one or more cuts of meat into the aperture.

16. The method as claimed in claim 14 further comprising pushing the one or more cuts of meat out of the constricted flexible sleeve.

17. The method as claimed in claim 14 further comprising applying a peristaltic force to the one or more cuts of meat from the flexible sleeve.

18. The method as claimed in claim 14 further comprising stretching the sleeve lengthwise to assist the flexible sleeve constrict around the one or more cuts of meat.

* * * * *